Feb. 20, 1951 M. S. CURTIS ET AL 2,542,399
MACHINE TOOL
Filed Sept. 9, 1946 4 Sheets-Sheet 1
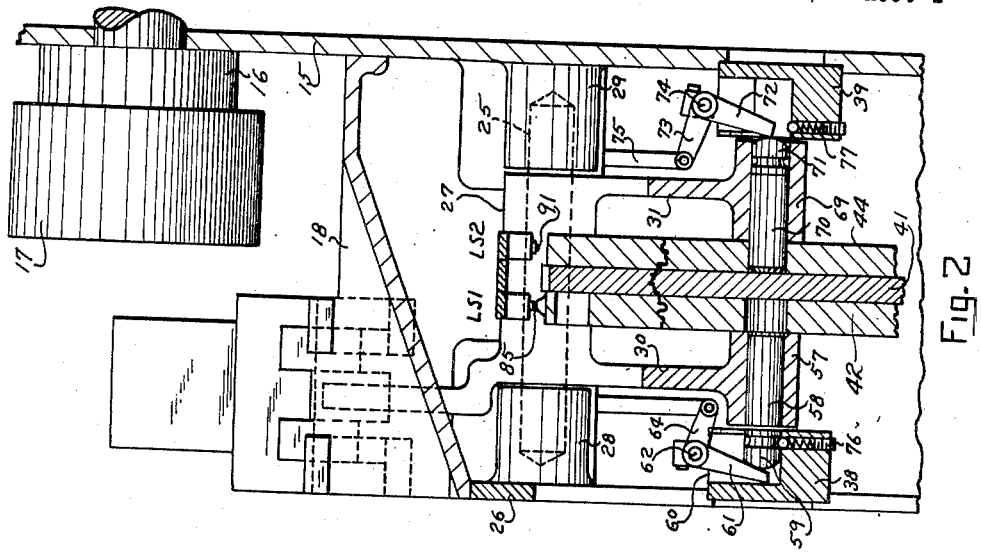
Fig. 2
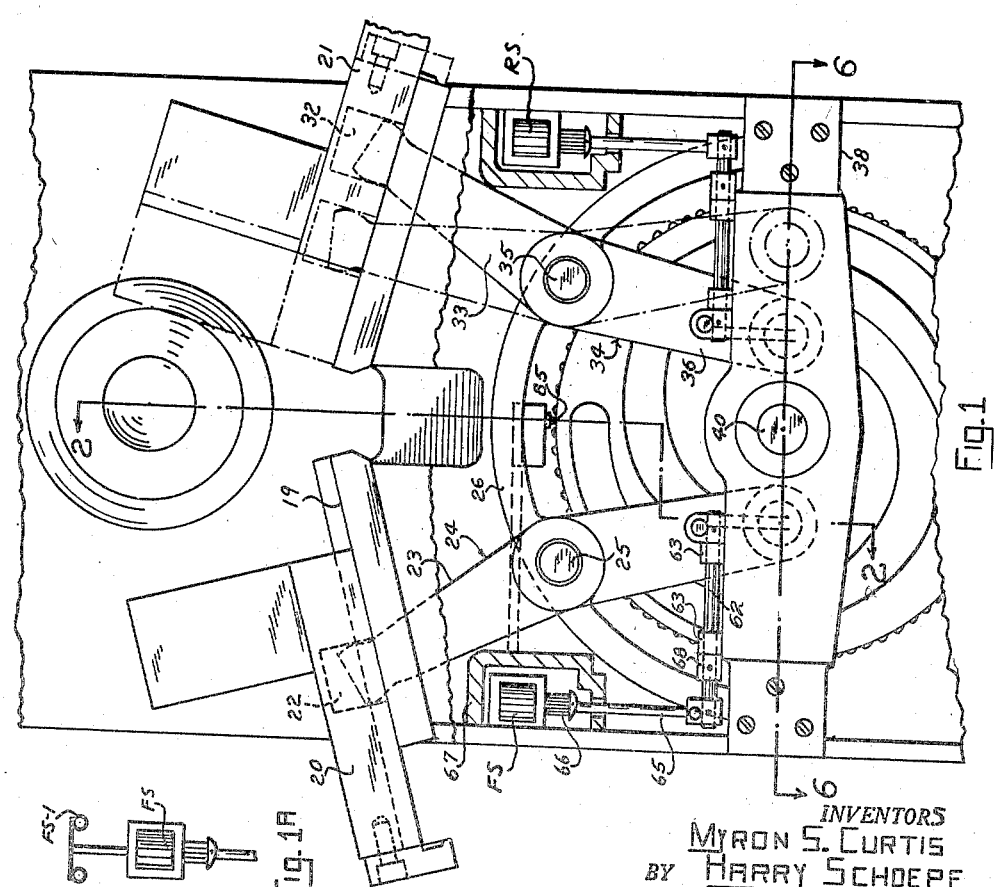
Fig. 1
Fig. 1A
INVENTORS
MYRON S. CURTIS
BY HARRY SCHOEPE
Kwis, Hudson, Boughton & Williams
ATTORNEYS Feb. 20, 1951  M. S. CURTIS ET AL  2,542,399
MACHINE TOOL Filed Sept. 9, 1946  4 Sheets-Sheet 2

INVENTORS
MYRON S. CURTIS
BY HARRY SCHOEPE
Kwis, Hudson, Boughton & Williams
ATTORNEYS

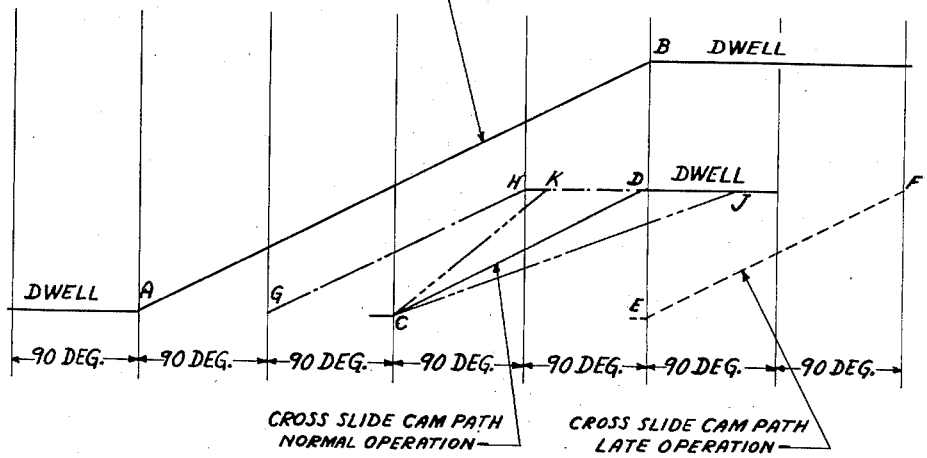
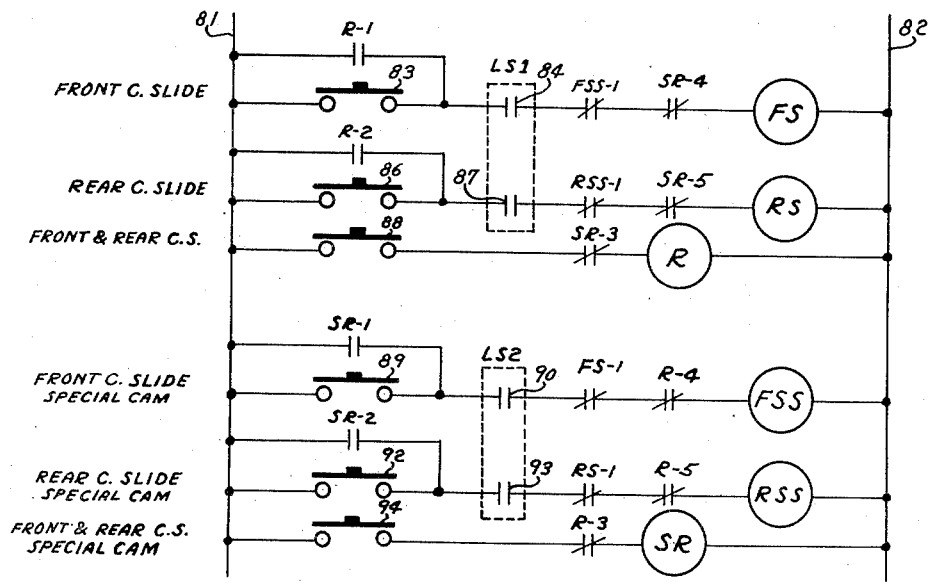

Feb. 20, 1951 M. S. CURTIS ET AL 2,542,399
MACHINE TOOL
Filed Sept. 9, 1946 4 Sheets-Sheet 4

INVENTOR.
MYRON S. CURTIS
HARRY SCHOEPE
BY
Kwis, Hudson, Boughton
& Williams
ATTORNEYS

UNITED STATES PATENT OFFICE 2,542,399

MACHINE TOOL

Myron S. Curtis and Harry Schoepe, Cleveland, Ohio, assignors to The Warner & Swasey Company, Cleveland, Ohio, a corporation of Ohio Application September 9, 1946, Serial No. 695,732

16 Claims. (Cl. 82—19)

This invention relates to machine tools and more particularly to improved means for actuating the cross slide or slides thereof.

An object of the invention is to provide a novel and improved machine tool having a plurality of cross slides and means to singly, simultaneously, or sequentially actuate the cross slides during a single step of an operating cycle, whereby a variety of different machining operations may be readily effected.

Another object of the invention is to provide a novel and improved machine tool in which the cross slide actuating mechanism includes a movable member having a cam surface thereon and means to effect an operative connection between the cross slide and the cam surface, the movable member having means thereon to automatically disengage the operative connection when the cross slide has returned to its initial position.

A further object of the invention is to provide a novel and improved machine tool having a movable holder adapted to carry work or tools, actuating mechanism therefor including a movable member provided with a plurality of cam paths and means to selectively establish an operative connection between the holder and any of the cam paths, each of the cam paths having means to automatically disengage the operative connection when the holder has returned to its initial position.

A still further object of the invention is the provision of a machine tool having a pair of cross slides and improved means for actuating the cross slides including a movable member having a plurality of cam surfaces thereon defining a plurality of independent cam paths, means to selectively establish an operative connection between the cross slides and the cam paths for single, simultaneous, or sequential actuation of the cross slides, and means cooperating with each cam path to automatically disengage the operative connection therewith when said cross slides have returned to their initial positions.

An additional object of the invention is to provide an improved machine tool comprising movement transmitting elements for actuating the cross slides, a movable member having a plurality of cam surfaces thereon defining independent cam paths and means to selectively establish an operative connection between the elements and the cam paths, the cam paths being so formed that the connections may each be established with a different cam path, or both elements may be operatively connected sequentially with a single cam path.

It is also an object of the invention to provide an improved machine tool in which the cross slide actuating mechanism is adapted to be engaged with a cam member and to be automatically retained in engagement therewith during a cycle of cross slide operation and automatically disengaged therefrom upon termination of said cycle.

Another object of the invention is to provide an improved machine tool having a movable holder adapted to carry work or tools, actuating mechanism therefor including a forked movement transmitting element and a movable member having independent cam paths on opposite faces thereof with which an operative connection of said forked element may be selectively established, each of the cam paths having means to automatically disengage the operative connection therefrom when the holder has returned to its initial position.

A further object of the invention is to provide an improved machine tool of the type described in the preceding object in which the operative connections include individual shiftable means carried by each branch of the forked element, and electrically operated means are provided to selectively connect either shiftable means with a cam path.

A still further object is the provision of an improved machine tool as defined in the two preceding objects with means to prevent operation of the other of the electrically operated means when one of said means is operated.

A more detailed object of the invention is to provide an improved machine tool comprising a pair of cross slides, a pair of cam disks adapted to rotate together, each cam disk having a pair of cam paths thereon and the disks being circumferentially adjustable relative to each other, and selectively operative means for connecting the cross slides with one or more of the cam paths, whereby the cross slides may be singly, simultaneously, or sequentially actuated when operatively connected with one of said cam disks or may be singly, simultaneously, or sequentially actuated through a special operating cycle by engagement with the other of the cam disks.

The invention may be further characterized as residing in certain novel features and details of construction and in various combinations and arrangements of parts, and further objects and advantages thereof will become apparent to those skilled in the art to which it pertains from the following description of the preferred embodiment thereof described with reference to the accompanying drawings in which similar reference characters represent corresponding parts throughout the several views, and in which Fig. 1 is a fragmentary end elevational view of the headstock and a portion of the frame of a machine tool constructed in accordance with this invention with portions broken away to more clearly reveal the construction;

Fig. 1A is a fragmentary, somewhat schematic view of one of the electromagnets of the improved machine tool and showing the contacts operatively associated therewith;

Fig. 2 is a sectional view taken substantially on the irregular line 2—2 of Fig. 1 and looking in the direction indicated by the arrows;

Figure 9:
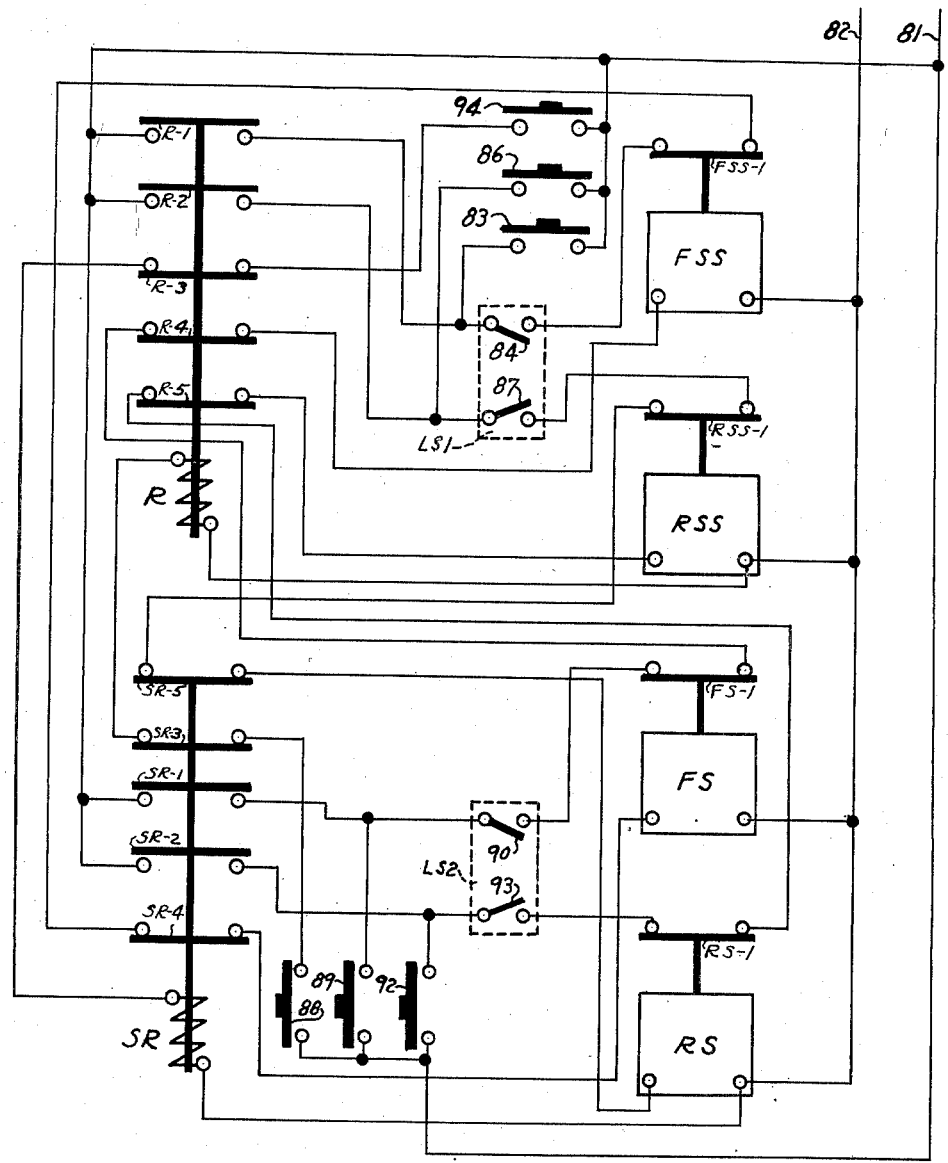

Fig. 7 is a timing chart illustrating the operational relationship of the cross slide movements in a step of the cycle of the machine tool; and Fig. 8 is a wiring diagram illustrating the selective controls for effecting cross slide actuation, the diagram being laid out in accordance with the standardized practice of the American electrical industry; and, Fig. 9 is a wiring diagram of the electrical control circuit for the machine corresponding to the circuit illustrated in Fig. 8 but laid out in accordance with Patent Office standards and requirements.

The present preferred embodiment of a machine tool constructed in accordance with this invention is illustrated in Figs. 1 and 2 as comprising a frame 15, only a portion of which is shown, in which is journaled a conventional work spindle 16 provided at its outer end with a work or tool holding means 17. The frame 15 further includes a support 18, located below the spindle and forwardly thereof, the said support being provided with inclined ways 19 for slidably guiding a front holder or cross slide 20 and a rear holder or cross slide 21, respectively, each of which is adapted to carry tools or work. The cross slide 20 is provided with a recess 22 in which is received the upper end of the arm 23 of a movement transmitting element or lever 24, the lever being pivoted by a pin or shaft 25 to arcuately shaped portions 26 of the frame 15. For this purpose the central portion of the lever is enlarged, as indicated at 27 in Fig. 2, and the pin or shaft 25 passes therethrough and is received in enlarged bosses 28 and 29 on the arcuate portions 26 of the frame 15. The lower arm of the element or lever 24 is forked to provide two spaced portions or branch arms 30 and 31 for a purpose hereinafter described.

The rear holder or cross slide 21 is also provided with a recess 32 for receiving the upper end of the arm 33 of a movement transmitting element or lever 34, which is pivoted by a pin or shaft 35 to the arcuate portions 26 of the frame 15 in the same manner as the element or lever 24. The lower portion or arm of element or lever 34 is forked in a similar manner to that previously mentioned for the lever 24, thereby providing spaced portions or branch arms 36 and 37. The two pivot pins 25 and 35 are preferably disposed at substantially equal distances on opposite sides of a plane passing through the centerline of the work supporting spindle so that the holders or cross slides may be moved towards and away from the spindle on opposite sides thereof.

Adjacent the lower ends of the forward branch arms 30 and 36 of the levers 24 and 34 the frame 15 is provided with a transversely extending bracket member 38. A similar bracket member 39 is provided on the frame 15 adjacent the rear arms 31 and 37 of the levers 24 and 34. Centrally of the brackets 38 and 39 is journaled a shaft 40 for rotatably mounting a gear wheel 41 which is adapted to be driven in timed relationship with the turret operating mechanism of the tool. The turret and the driving means for the gear 41 are conventional and hence are not illustrated. A movable member or cam disk 42 is mounted upon the forward face of the gear 41 by suitable means such as screws 43 (see Fig. 3). The rear face of the gear wheel 41 may be provided with a second movable member or cam disk 44 which is adapted to be adjustably connected with the gear wheel by suitable fastening means such as screws 45 passing through arcuate slots 46 in the cam disk thereby enabling circumferential adjustment of the latter with respect to the gear 41 and the disk 42.

Figure 4:
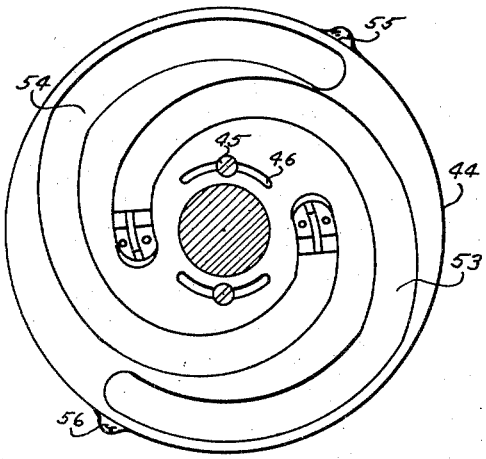
Fig. 4 is a front elevational view of a cam disk similar to that shown in Fig. 3 but represented as circumferentially displaced slightly with respect thereto for performing a special operation.
Figure 5:
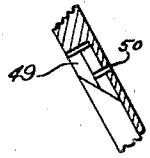
Fig. 5 is a sectional view taken on the line 5—5 of Fig. 3.
Figure 3:
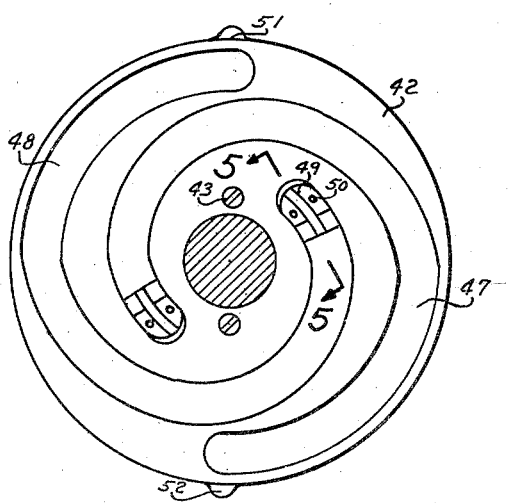
Fig. 3 is a front elevational view of the standard cam disk of the apparatus.

The cam disk 42, which will hereinafter be referred to as the standard disk or movable member, has its outer face provided with a pair of cam surfaces or cam paths 47 and 48, which are here shown (see Fig. 3) as formed by two identically shaped and circumferentially displaced grooves or cam paths extending from points adjacent the central area of the disk to points adjacent the outer periphery thereof, the outer end of each cam surface or path having a portion with a constant radius of curvature for a purpose to be hereinafter described. The inner end of each of the cam paths or grooves is provided with an inclined portion 49, which slopes from the depth of the cam groove to the upper face of the cam disk. This inclined portion 49 may be formed as an integral part of the cam disk but as here illustrated it is a separate member which is secured to the cam disk by means of pins or studs 50. As shown in Figs. 3, 4 and 5, this inclined surface preferably has a central rib portion, which extends from the base of the cam groove to a point parallel with the face of the cam disk, and two side portions having a top surface below the outer face of the cam disk for receiving the said fastening means 50. The cam 42 is further provided with two projections 51 and 52 extending radially outwardly a short distance from the periphery of the cam and in this instance are disposed 180° apart.

The movable member or cam disk 44, hereinafter referred to as the special cam disk, is provided with two camming surfaces or paths 53 and 54, which may have any desired configuration. As shown in Fig. 4, however, the surfaces or paths 53 and 54 are represented as cam grooves having the same configuration as the cam grooves 47 and 48 on the standard cam disk 42, the special cam 44 being represented as circumferentially displaced relative to the position of the cam disk 42. This adjustment is effected by loosening the screws 45 and turning the disk 44 to the desired position and then retightening the screws. The periphery of cam disk 44 is also provided with two radially extending portions 55 and 56, identical with the projections 51 and 52 provided on the periphery of cam 42, and each of the grooves or cam paths 53 and 54 is provided with an inclined portion 49 similar to the corresponding inclined portions at the inner ends of the cam grooves 47 and 48.

Figure 6:
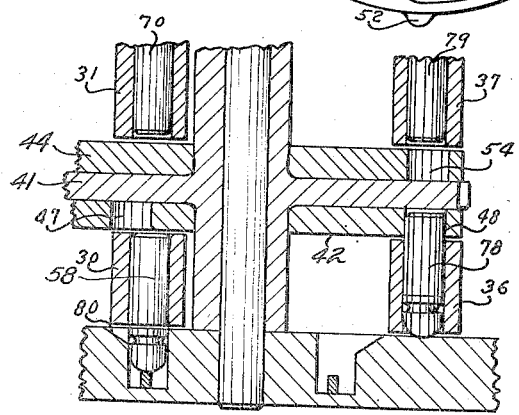
Fig. 6 is a fragmentary, sectional view taken substantially on the line 6—6 of Fig. 1.

The lower arms of the levers 24 and 34, as previously mentioned, are forked to provide the spaced portions or branch arms 30, 31 and 36, 37, respectively. The lower end of the branch arm 30 of lever 24 is provided with an elongated boss 57 (see Figs. 2 and 6) having a bore therethrough in which is received a shiftable means such as a slidable pin 58, the inner end of which is adapted to be projected outwardly of the bore into engagement with either of the cam grooves 47 or 48 of the standard cam disk 42 to act as a cam follower. The element or lever 24 may therefore be operatively connected with the cam disk 42 to be rocked thereby and actuate the front cross slide 20.

For the purpose of effecting the sliding movement of the pin 58, the bracket 38 is provided with an opening for slidably receiving a pusher block 59, which is in alignment with the pin 58 when the lever 24 is in its initial or starting position. The bracket 38 is further provided with a slot 60, communicating with the opening for receiving pusher block 59. Entering into the slot 60, and extending behind the rounded end of the pusher block 59, is an arm 61 attached to the inner end of a rod 62 which is journaled in aligned bosses 63 on the upper surface of the bracket 38. The outer end of the rod 62 is provided with an arm 64 connected to rock with the shaft 62, the arms 61 and 64 forming a bell crank lever. The outer end of the arm 64 is pivoted to the lower end of a link 65, the upper end of which is connected with an armature 66 of an electromagnet FS which is enclosed within a suitable cover 67 attached to the support 18. One or more collars 68 may be provided upon the shaft 62 to prevent longitudinal displacement thereof. The mechanism just described is so constructed that when the electromagnet FS is energized it will rock the bell crank lever, composed of arms 64 and 61, thus moving the pusher block 59 inwardly and force the pin 58 into engagement with a cam groove on the disk 42.

The rear branch arm 31 of the lever 24 is likewise provided with an elongated boss 69 having a bore in which is slidably received a shiftable means or pin 70, the inner end of which is adapted to enter a cam groove on the special cam disk 44. The bracket 39 is provided with an opening in which is slidably received a pusher block 71, adapted to be actuated by a bell crank lever comprising arms 72 and 73 connected for rocking with a rod or shaft 74, the construction of these parts being identical with the bell crank previously described. The outer end of the arm 73 is pivoted to a link 75 which is connected with the armature of an electromagnet FSS, which is not shown in Figs. 1 and 2 but is schematically represented in Fig. 8. The brackets 38 and 39 are each provided with vertical openings or bores in which are received spring detents 76 and 77, respectively, for engagement with small circular grooves provided in the pusher blocks 59 and 71 to hold the latter in their retracted or inactive positions and prevent dislodgment therefrom by vibration or the like.

The lower spaced or branch arms 36 and 37 of the lever 34 are likewise provided with enlarged bosses in which are received shiftable means such as slidable pins 78 and 79, respectively, which are operated by mechanisms similar to that described for the pins 58 and 70 of arm 24. The electromagnets for operating the pins 78 and 79 are indicated in Fig. 8 by the reference characters RS and RSS, respectively, and the electromagnet RS with its associated bell crank lever is illustrated in Fig. 1.

Assuming that the electromagnet FS has been energized and the disk 42 is positioned so that a portion of one of the cam grooves thereon is in alignment with the inner end of the pin 58, the bell crank lever will rock, thus causing arm 61 thereof to force the pusher block 59 to the right as viewed in Fig. 2. The engagement of the inner end of pusher block 59 with the pin 58 slides the latter until its inner end enters the cam groove, the parts then occupying the position corresponding to those illustrated for pin 70 and pusher block 71 in the right-hand portion of Fig. 2. It will be observed that the pusher block will now be completely received within the bore of the boss 57 provided at the lower end of the branch arm 30. As the cam disk rotates the pin 58, riding in the groove, will rock the lever 24 about its pivot 25 and actuate the front cross slide 20, the lever carrying with it the pin 58 and the pusher block 59. The rounded end of the pusher block 59 will thus ride upon the inner face of the bracket 38 to positively hold the pin 58 in engagement in the cam groove. This rocking of lever 24 will advance the front cross slide 20 towards the work or tool held in the holding means 17 provided on spindle 16 when the gear 41 is rotated in one direction during a portion of the operating cycle of the machine. When the gear 41 and the cam disk 42 attached thereto are rotated in the reverse direction during the cycle, the lever 24 will be rocked in a reverse direction returning the cross slide to its initial or starting position and returning the lower arm 30 of the lever back to its initial position shown in Fig. 1.

During the latter portion of the return movement of lever 24, the inclined member 49 in the cam groove will engage the pin 58 and force the latter outwardly, thereby pushing the block 59 back into its opening in the bracket 38. To permit the movement of the pusher block and guide its movement as the inclined portion 49 acts on pin 58, the opening for the block 59 in the bracket 38 is provided with an inclined surface 80 (see Fig. 6).

A similar operation occurs when the electromagnet RS is energized for actuation of the rear cross slide 21, the pin 78 carried by the forward arm of lever 34 being thereby engaged with a cam surface or path on the disk 42 for rocking of the lever 34 and consequent actuation of the cross slide. If cross slide movements are desired which are somewhat different from that provided by energization of electromagnets FS and RS, the electromagnets FSS and RSS may be energized. Thus, energization of electromagnet FSS shifts the pin 70, carried by the branch arm 31 of lever 24, into engagement with a cam surface or path on the special cam 44. The lever 24 will then be rocked by the rotation of the cam disk 44 actuating the front cross slide, as previously described for the operation with the use of electromagent FS and disk 42. Likewise, the rear cross slide 21 may be actuated by the special cam disk 44 by engaging the pin 79 with a cam path or groove on the disk 44 through energization of the electromagnet RSS. The shapes of the cam grooves on disk 44 may be different from the shapes of the grooves on disk 42, or the grooves on the two disks may be identical and the disk 44 angularly displaced relative to disk 42, so that the cross slide movements imparted by disk 44 are different from those imparted by disk 42. It will be observed that, since the shiftable pins, such as 58, and the pusher blocks, such as 59, are separate, there is no interference with the rocking of a lever, such as 24, when one of the electromagnets, such as FS, is energized and the companion electromagnet, such as FSS, is not energized. Moreover, as will hereinafter become apparent, means are provided to prevent simultaneous energization of the two electromagnets cooperating with a single lever.

A suitable circuit for effecting the desired operation of the cross slides is illustrated in Figs. 8 and 9. This circuit comprises a pair of electrical power supply leads 81 and 82 between which the actuating electromagnets for the shiftable means or pins are connected in parallel circuits. Each of these parallel circuits contains a manually operable switch, a cam actuated switch, an electromagnet actuated switch, and a relay operated switch. Thus the circuit for energizing the electromagnet FS, for effecting the engagement of the pin 58 with a cam surface on disk 42, extends from the power lead 81 in series through the normally open contacts of a manually operable push button 83, one pair of normally open contacts 84 of a cam operated switch LS1, normally closed contacts FSS—1, normally closed contacts SR—4, and through the electromagnet FS to the power lead 82. The cam operated switch LS1, which has two pairs of normally open contacts, is located adjacent the periphery of cam 42 (see Figs. 1 and 2) and has an operating button 85 adapted to be engaged by the projections 51 and 52 on cam disk 42. As shown in Figs. 1 and 2, the projection 51 is in engagement with the button 85, thus holding the contacts of switch LS1 open. Hence, operation of push button 83 will not energize the electromagnet FS until the cam disk 42 has rotated sufficiently to cause the projection 51 to move from under the operating button 85 and thereby close the contacts 84 of switch LS1.

The electromagnets, such as FS, are each provided with an extension on the armature thereof, see Fig. 1A, for opening normally closed contacts such as FS—1 when the electromagnet is energized. This is provided as a safety feature to prevent inadvertent, simultaneous energization of the two electromagnets cooperating with a single cross slide moving lever. When the electromagnet FS is energized, the opening of the contacts FS—1 prevents energization of the electromagnet FSS, thus insuring that pin 70 cannot be simultaneously engaged with cam disk 44 when the electromagnet FS is energized for engagement of pin 58 with cam disk 42. As will become apparent, each of the electromagnets is likewise provided with a similar switch to prevent inadvertent energization of its companion electromagnet. Thus, the electromagnet FSS operates contacts FSS—1, electromagnet RS operates contacts RS—1, and electromagnet RSS operates contacts RSS—1. The contacts SR—4, in the circuit for electromagnet FS, are operated by a relay SR in a circuit, subsequently to be described, to further prevent improper energization of FS.

The circuit for electromagnet RS is similar to that for the electromagnet FS and extends from power lead 81 through the normally open contacts of a manually operable push button switch 86, the second pair of normally open contacts 87 of the cam operated switch LS1, normally closed contacts RSS—1, normally closed contacts SR—5, and through electromagnet RS to the power lead 82. It will be remembered that the contacts RSS—1 are mounted for opening by energization of the electromagnet RSS in the same manner as previously described with respect to the electromagnet FS and its contacts FS—1. The contacts SR—5 are operated by relay SR, subsequently to be described.

If it be desired to simultaneously energize the electromagnets FS and RS for simultaneous actuation of the front and rear cross slides by the cam disk 42, a push button switch 88 may be operated, thereby closing a circuit from the power lead 81 through the said switch 88, normally closed contacts SR—3, and a relay R to the power lead 82. The relay R has two sets of normally open contacts R—1 and R—2, which are respectively bridged about the manually operable push button switches 83 and 86. Hence, when push button 88 is operated, the resulting energization of relay R effects closing of its contacts R—1 and R—2, thereby simultaneously energizing electromagnets FS and RS when the contacts 84 and 87 of switch LS1 are closed. The relay R also has normally closed contacts R—3, R—4 and R—5 disposed in the circuits of relays SR, FSS and RSS, respectively, to open these circuits, thus preventing actuation of the pins 70 and 79 into engagement with the special cam 44 when the pins associated with the standard cam 42 are being employed through the use of the push button 88. Of course, the front and rear cross slides may be simultaneously operated by simultaneously operating the push buttons 83 and 86, but this is generally not convenient and hence the push button 88 is provided to enable the simultaneous actuation of the cross slides by the operation of a single manual switch.

The circuit for electromagnet FSS, which is employed to effect engagement of pin 70 with the special cam 44, extends from the power lead 81 through the normally open contacts of a manually operable push button switch 89, one pair of normally open contacts 90 of a cam operated switch LS2, the normally closed contacts FS—1 and R—4 and through the electromagnet FSS to the power lead 82. The cam operated switch LS2, which has two sets of normally open contacts, is positioned adjacent the periphery of cam disk 44 and is provided with an operating button 91 adapted to be engaged by the projections 55 and 56 on the periphery of the cam disk 44. The switch LS2 is so designed that when the operating button 91 is in engagement with one of the said projections, the contacts are open and are closed when the cam disk has rotated sufficiently to remove the projection from in under the button 91. It will be remembered that the normally closed contacts FS—1 are operatively connected with the armature of electromagnet FS and are open only when the latter electromagnet is energized. The contacts R—4, which are connected for operation by relay R are opened only when the push button 88 is employed. Hence, the electromagnet FSS cannot be energized when either push button 83 or 88 is operated to energize the electromagnet FS.

The circuit for the electromagnet RSS is similarly connected to the power lead 81 and 82 through a manually operable push button switch 92, the second set of contacts 93 of the cam operated switch LS2, and the normally closed contacts RS—1 and R—5. As previously mentioned, the contacts RS—1 are open only when the electromagnet RS is energized, and likewise the contacts R—5 are opened only when relay R is energized to prevent simultaneous energization of electromagnets RS and RSS. In order to provide for simultaneous actuation of the front and rear cross sides by means of the special cam 44, a relay SR is connected to the power leads 81 and 82 through a manually operable push button switch 94 and normally closed contacts R—3, the latter contacts being controlled by the previously mentioned relay R. Relay SR has two sets of normally open contacts SR—1 and SR—2 bridged around the push button switches 89 and 92, respectively, whereby the actuation of the push button 94 simultaneously energizes electromagnets FSS and RSS. The relay SR is also provided with the normally closed contacts SR—3, SR—4 and SR—5 which are located in the circuits for the relay R and the electromagnets FS and RS, respectively. Hence, when the push button 94 is operated, the circuits for the electromagnets associated with the standard cam 42 will be opened so that they may not be inadvertently operated.

The timed relationship of some of the various possible cross slide operations to the working cycle of the machine will be apparent from an inspection of Fig. 7 of the drawings. As illustrated therein, the curve CD represents the operation of either or both the front or rear cross slides when actuated for normal; i. e., full stroke operation by the standard cam 42. Assuming that the machine is in operation and that only the front cross slide is to be actuated during the first step of the cycle, the operator depresses the push button of switch 83 and holds it depressed while the turret is rapidly advancing, as represented by the curve AB. This turret travel may be effected by any desired mechanism not here illustrated, but which is disclosed in the copending application of Myron S. Curtis and Harry Schoepe, Serial No. 684,595, filed on July 18, 1946 and entitled "Machine Tool." The electromagnet FS will be energized as soon as the cam disk 42 has rotated sufficiently for the projection 51 to move from under the operating button 85 of switch LS1. This energization of electromagnet FS will then rock the arm 61 of the bell crank lever causing the pusher block 59 to shift the pin 58 into contact with the surface of the cam disk 42, the pin then riding over the inclined portion 49 and entering the cam groove 47. The operator may then release the push button 83, and the pin 58 riding in the cam groove 47 will actuate the front cross slide in accordance with the curve CD. It will be remembered that during this movement the branch arm 30 of the lever 24 will be rocked with the head of the pusher block 59 sliding on the inner face of bracket 38, thus positively retaining the pin 58 in the cam groove 47.

By the time the turret has completed its forward travel, as represented by curve AB, the front cross slide will likewise have completed its forward travel, as represented by curve CD. The continued operation of the machine causes both the turret and the cross slide to effect a dwell to provide for cleaning up operations, the dwell for the cross slide being provided by a portion of the cam groove 47 which has a constant radius of curvature. The turret operating mechanism is then reversed and the gear 41, to which the cam 42 is connected, is likewise reversed, thereby returning the turret and cross slide to their initial or starting positions. As the cross slide reaches its starting or initial position, the branch arm 30 of the lever 24 will have rocked back to the position substantially as shown in Fig. 1, and the pin 58 will thus ride up on the inclined portion 49 of the cam groove 47 forcing the said pin and the cooperating pusher block 59 back to their original positions, as indicated in Fig. 2. This returning movement of the pusher block is facilitated by the aforementioned inclined surface 80 on the bracket 38. The block 59 will then be retained in this position by the spring detent 76 until the electromagnet FS is again energized.

A similar operation may be effected for the rear cross slide 21 by actuation of the push button 86 during another step of the cycle, or if desired, both front and rear cross slides may be simultaneously actuated during a single step of the cycle by the operation of the push button 88.

The apparatus further enables the use of a turret slide tool actuated by a cross slide for internal facing or similar operations. This may be effected by movably mounting the tool upon the turret and by actuating the cross slide to bring a member therein into engagement with the tool to move the latter when the turret has reached its most forward position and is in the dwell portion of the cycle. This situation is represented by the curve EF in Fig. 7 and is effected by depressing the push button 83 or 86, depending upon whether the front or rear cross slide is to be employed, shortly before the turret reaches its most forward position. Assuming that the front cross slide is to be so employed, the push button 83 is depressed energizing the electromagnet FS, thus tending to move the corresponding pin into engagement with the cam groove 48, which was formerly used by the rear cross slide. It will be observed that if the cam disk 42 has not yet rotated sufficiently for the pin 58 to engage in the groove 48, the said pin will ride upon the face of the disk until it can move into the groove 48. Continued rotation of the cam disk will then actuate the cross slide in the manner previously described causing a pusher bar mounted thereon to engage the turret tool and advance the latter crosswise of the face of the turret in a machining operation. As the actuating mechanism for the turret begins its reverse rotation, the cam disk 42 will immediately begin the withdrawal of the cross slide, as is shown in Fig. 7, and when it reaches its initial position, the return motion of the turret will occur. It will be apparent that either cross slide may be employed in this type of operation.

The cross slides may also be sequentially operated during a single step of a working cycle of the machine. Thus, by first operating the push button 83, the pin 58 may be engaged in cam groove 47 for moving the front cross slide in accordance with the curve CD. After this movement has started, the push button 86 may be operated and the pin 78 will also engage in the cam groove 47 after the disk 42 has rotated a half revolution thereby moving the rear cross slide for a part of a stroke in accordance with the curve EF. By reversing the order of actuation of the push buttons 83 and 86, the order of sequential movement of the front and rear cross slides may be reversed, the cam groove 48 now being engaged by the pins of levers 24 and 34.

When it is desired to actuate the cross slides during a different portion of the turret operation or to provide a different feed for one or both of the cross slides, the special cam disk 44 may be employed. By way of example, this special cam disk is illustrated in Fig. 4 as comprising cam grooves or paths 53 and 54 which are substantially identical with those upon the standard cam disk 42. However, the special cam disk 44 may be circumferentially displaced with respect to the standard cam disk to vary the period during which the cross slide is actuated in a step of the work cycle. This relationship is indicated by the curve GH in Fig. 7, from which it will be seen that the cross slides may be actuated during an earlier portion of the turret travel. The actuation of the front and rear cross slides 20 and 21, respectively, either singly, simultaneously, or sequentially is effected in the same manner as previously described when the cam 42 is employed, the only difference being that the operator now employs the push button switch 89, 92, or 94 for connecting the cam actuating levers 24 and 34 to the special cam 44.

It will be apparent that this special cam disk 44 may have its cam grooves shaped in any suitable configuration to provide the desired rate of the feed and need not have the same configurations as those employed upon the cam disk 42. For example, by suitably shaping the cam grooves, the cross slides may be fed in accordance with the curve CJ of Fig. 7, in which instance a short dwell period is provided. Likewise, when it is desired to employ a tool which is carried by a cross slide but is to be actuated by a turret, the cam 44 may have its groove so shaped as to provide a rapid feed and a long dwell, as is represented by the groove CK. Other modifications and variations of cross slide operation can be effected by providing various other shapes of cam surfaces on the disk 44 and/or circumferentially adjusting the latter relative to the disk 42 as permitted by the slots 46.

While there has been disclosed a preferred embodiment of the invention and certain types of operations that may be effected thereby, the invention is not limited to the exact constructions and operations illustrated and described but only as required by the spirit and scope of the appended claims.

Having thus described our invention, we claim:

1. A machine tool of the type described comprising a frame, a spindle journaled in said frame, a holder movably mounted on said frame and adapted to carry a tool or tools, a movement transmitting element having one portion thereof operatively connected with said holder for moving the latter, another portion of said element being provided with two spaced branch arms, a movable member extending into the space between said branch arms and having opposed faces adjacent the branch arms, a cam surface on each of the opposed faces of the movable member, and means for selectively establishing an operative connection between either branch arm and the adjacent cam surface to move the said holder towards and away from the spindle when the said member is moved, whereby either of two different movements may be selectively imparted to the holder.

2. A machine tool of the type described comprising a frame, a spindle journaled in said frame, a holder movably mounted on said frame and adapted to carry a tool or tools, a movement transmitting element having one portion thereof operatively connected with said holder for moving the latter, another portion of said element being provided with two spaced branch arms, a movable member extending into the space between said branch arms and having opposed faces adjacent the branch arms, a cam surface on each of the opposed faces of the movable member, means for selectively establishing an operative connection between either branch arm and the adjacent cam surface to move the said holder towards and away from the spindle when the said member is moved, and means on said member for automatically disengaging the operative connection between a branch arm and the adjacent cam surface when the holder has returned to its initial position.

3. A machine tool of the type described comprising a frame, a spindle journaled in said frame, a holder movably mounted on said frame and adapted to carry a tool or tools, a movement transmitting element operatively connected with said holder for moving the latter, a movable member having a plurality of cam surfaces thereon defining independent cam paths each adapted to move the holder towards and away from the spindle when said member is moved, means carried by said element and movable relative thereto selectively into engagement with any one of said cam paths to provide an operative connection between said element and said member, and means cooperating with each cam path for automatically disengaging the said means carried by said element from a cam path with which it is engaged when the holder has returned to its initial position.

4. A machine tool of the type described comprising a frame, a spindle journaled in said frame, a pair of holders movably mounted on said frame and adapted to carry a tool or tools, a pair of movement transmitting elements each having a portion thereof operatively connected with a holder respectively, another portion of each of said elements being provided with a pair of spaced arms, a movable member extending into the spaces between said arms and having opposed faces each provided with a plurality of cam surfaces defining a plurality of independent cam paths, means for selectively establishing an operative connection between either arm of either element and an adjacent cam path to move the corresponding holder towards and away from the spindle, and means cooperating with each cam path to automatically disengage the operative connection between each arm and its cam path when the said holders have returned to their initial positions.

5. A machine tool of the type described comprising a frame, a spindle journaled in said frame, a pair of holders movably mounted on said frame and each adapted to carry a tool or tools, a pair of movement transmitting elements each operatively connected with a holder for moving the latter, a movable member having cam surfaces thereon defining a pair of independent cam paths each adapted to move a holder towards and away from said spindle when said member is moved, means for selectively establishing an operative connection between each element and a cam path on said member, the said cam paths being identically shaped and circumferentially displaced with respect to each other so that each of said elements may be operatively connected with a separate cam path or both elements may be sequentially connected with a single cam path, and means cooperating with each cam path for automatically disengaging the operative connections of the elements therefrom when each of the holders has returned to its initial position.

6. A machine tool of the type described comprising a frame, a spindle journaled in said frame, a holder movably mounted on said frame and adapted to carry a tool or tools, a movement transmitting element operatively connected with said holder for moving the latter, a movable member having a cam surface thereon, shiftable means carried by said element, means to operatively engage the shiftable means with the cam surface to move the holder towards and away from the spindle when the said member is moved, and means on said member for automatically disengaging the shiftable means therefrom when the holder has returned to its initial position.

7. A machine tool of the type described comprising a frame, a spindle journaled in said frame, a pair of holders movably mounted on said frame and each adapted to carry a tool or tools, a pair of movement transmitting elements each operatively connected with a holder for moving the latter, a movable member having cam surfaces thereon defining a plurality of independent cam paths each adapted to move a holder towards and away from said spindle when said member is moved, individual shiftable means carried by each of said elements, means to selectively engage each shiftable means with a cam path, and means cooperating with each cam path to automatically disengage the shiftable means therefrom when both holders have returned to their initial positions.

8. A machine tool of the type described comprising a frame, a spindle journaled in said frame, a pair of holders movably mounted on said frame and each adapted to carry a tool or tools, a pair of movement transmitting elements each operatively connected with a holder for moving the latter, a movable member having cam surfaces thereon defining a plurality of independent cam paths each adapted to move a holder towards and away from said spindle when said member is moved, individual shiftable means carried by each of said elements, an individual electrical operated means cooperating with each shiftable means to engage the latter with a cam surface when the electrically operated means is energized, means for selectively energizing said electrically operated means, and means cooperating with each cam path to disengage the shiftable means therefrom when both holders have returned to their initial positions.

9. A machine tool of the type described comprising a frame, a spindle journaled in said frame, a holder movably mounted on said frame and adapted to carry a tool or tools, a movement transmitting element having one portion thereof operatively connected with said holder for moving the latter, another portion of said element being provided with two spaced arms, a movable member extending into the space between said arms and having opposed faces adjacent to said arms respectively, a cam surface on each of the opposed faces of the movable member, means to adjust one of said cam surfaces relative to the other, means for selectively establishing an operative connection between either arm and the adjacent cam surface to move the said holder towards and away from the spindle when the said member is moved, and means on said member for automatically disengaging the operative connection between an arm and the adjacent cam surface when the holder has returned to its initial position.

10. A machine tool of the type described comprising a frame, a spindle journaled in said frame, a holder movably mounted on said frame and adapted to carry a tool or tools, a movement transmitting element having one portion thereof operatively connected with said holder for moving the latter, another portion of said element being provided with two spaced arms, a movable member extending into the space between said arms and having opposed faces adjacent thereto respectively, a cam surface on each of the opposed faces of the movable member, individual electrically operated means operatively associated with each arm and adapted to selectively establish an operative connection between either arm and the adjacent cam surface to move the said holder towards and away from the spindle when the said member is moved, an electrical circuit including means for selectively energizing said electrically operated means, means in said circuit to prevent energization of the other of said electrically operated means when one of them is energized, and means cooperating with each cam surface to automatically disengage the operative connection of an arm therefrom when the holder has returned to its initial position.

11. A machine tool of the type described comprising a frame, a spindle journaled in said frame, a pair of cross slides slidably mounted on said frame, a pivoted lever associated with each cross slide with one arm of each lever operatively connected to its corresponding cross slide, individual shiftable means carried by the other arm of each lever, a movable member having a pair of identically shaped cam grooves therein and each adapted to move a cross slide towards and away from said spindle when a shiftable means is engaged therewith and the said member is moved, electrically operated means to selectively engage the shiftable means with the cam grooves, and means cooperating with each cam groove to automatically disengage the shiftable means therefrom when both cross slides have returned to their initial positions, the cam grooves being so located relative to the shiftable means that the cross slides may be singly or simultaneously actuated by separate cam grooves or may be sequentially actuated by a single cam groove.

12. A machine tool of the type described comprising a frame, a spindle journaled in said frame, a pair of cross slides slidably mounted on said frame, a pivoted lever associated with each cross slide, one arm of each lever being operatively connected to its corresponding cross slide to actuate the latter when the lever is rocked and the lower arm of said levers being forked to provide spaced branch arms, individual shiftable means carried by each of said branch arms, a pair of cam disks journaled for rotation on said frame with the disks extending between the branch arms of each lever, a pair of independent cam paths on each disk, each cam path being adapted to move a cross slide towards and away from said spindle when one of said shiftable means is engaged therewith and the said disk is rotated, electrically operated means to selectively engage the shiftable means with the cam paths, and means cooperating with each cam path to disengage the shiftable means therefrom when the cross slides have returned to their initial positions.

13. A machine tool as defined in claim 12 and further comprising means to prevent the operation of the shiftable means carried by one branch arm of each lever when the shiftable means carried by the other branch arm of that lever has been engaged with a cam path.

14. A machine tool as defined in claim 12 and further comprising means for automatically retaining the shiftable means that have been engaged with the cam paths in engagement therewith until the cross slides have returned to their initial positions.

15. A machine tool of the type described comprising a frame, a work support on said frame, a holder movably mounted on said frame and adapted to carry a tool or tools, a motion transmitting element operatively connected with said holder for moving the latter, a movable member having cam surfaces thereon defining a pair of independent cam paths each adapted to move the holder towards and away from said spindle when said member is moved, means for selectively establishing an operative connection between said element and either cam path on said member including means carried by said element and movable relative thereto into engagement with either cam path, the said cam paths being displaced with respect to each other so that either of two different movements may be imparted to said holder, and means cooperating with each cam path for automatically disengaging the operative connection of the element therefrom when said holder has returned to its initial position.

16. A machine tool of the type described comprising a frame, a spindle journalled in said frame, a pair of holders movably mounted on said frame and each adapted to carry a tool or tools, a pair of movement transmitting elements each operatively connected with a holder for moving the latter, a movable member having a plurality of cam surfaces thereon defining independent cam paths each adapted to move a holder towards and away from said spindle when said member is moved, means including individually operatable means cooperating with each element respectively for selectively establishing an operative connection between each element and a cam path on said member, the said cam paths being so shaped that the said operatable means may be actuated to effect single, simultaneous or sequential movement of the holders, and means cooperating with the cam paths for automatically disengaging the operative connections of the elements therefrom when each of the holders has returned to its initial position.

MYRON S. CURTIS.
HARRY SCHOEPE.

REFERENCES CITED

The following references are of record in the file of this patent:

UNITED STATES PATENTS

| Number | Name | Date |
|---|---|---|
| 927,432 | Seward | July 6, 1909 |
| 992,277 | Smith | May 16, 1911 |
| 2,001,586 | Rupple | May 14, 1935 |
| 2,450,096 | Siekmann | Sept. 28, 1948 |

FOREIGN PATENTS

| Number | Country | Date |
|---|---|---|
| 666,776 | France | Oct. 5, 1929 |